(12) United States Patent
DeVries et al.

(10) Patent No.: US 7,093,706 B2
(45) Date of Patent: *Aug. 22, 2006

(54) CONVEYOR BELT CLEANING SYSTEM

(75) Inventors: Brett Edwin DeVries, Grand Rapids, MI (US); John H. Winkelman, Naperville, IL (US); Mark L. Walde, Naperville, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 98 days.

This patent is subject to a terminal disclaimer.

(21) Appl. No.: 10/661,461

(22) Filed: Sep. 10, 2003

(65) Prior Publication Data

US 2004/0112716 A1 Jun. 17, 2004

Related U.S. Application Data

(63) Continuation-in-part of application No. 10/270,813, filed on Oct. 15, 2002, now Pat. No. 6,823,983.

(51) Int. Cl.
*B65G 45/00* (2006.01)

(52) U.S. Cl. .................. 198/499; 198/498; 198/497

(58) Field of Classification Search ......... 198/497–499
See application file for complete search history.

(56) References Cited

U.S. PATENT DOCUMENTS

| | | |
|---|---|---|
| 936,887 A | 10/1909 | Healey |
| 3,342,312 A | 9/1967 | Reiter |
| 3,674,131 A | 7/1972 | Matson |
| 3,767,210 A | 10/1973 | Havens et al. |
| 3,841,470 A | 10/1974 | Meguro |
| 3,952,863 A | 4/1976 | Schattauer |
| 3,994,384 A | 11/1976 | Reiter |
| 4,031,252 A | 6/1977 | Sullivan et al. |
| 4,036,354 A | 7/1977 | Reiter |
| 4,053,045 A | 10/1977 | Reiter |

(Continued)

FOREIGN PATENT DOCUMENTS

CA 1 221 050 4/1987

(Continued)

OTHER PUBLICATIONS

MARTIN® Reversing Mount Tensioners Operator's Manual, © Martin Engineering 1996, 1998, Aug. 1999, 30 pages.

*Primary Examiner*—Gene O. Crawford
*Assistant Examiner*—Rashmi Sharma
(74) *Attorney, Agent, or Firm*—Fitch, Even, Tabin & Flannery

(57) ABSTRACT

A conveyor belt cleaner is provided that is particularly well-suited for high temperature applications. The cleaner includes a blade mount that has a layback arm mounting the cleaning blade and which can simultaneously deflect horizontally and vertically via changes in the radius of curvature of a lower arcuate portion connected thereto so as to minimize stress on the blade mount. The layback arm extends toward the conveyor belt at an acute layback angle relative to the immediately upstream belt surface. In another aspect, a belt cleaning system is provided including a plurality of resilient blade mounts that absorb the energy of impacts with the cleaning blade so as to allow for controlled release of the impact energy upon bringing the blade quickly back into scraping engagement with the belt. Preferably, two of these resilient mounts are associated with each blade in the belt scraping area and the others at ends of an elongate support laterally spaced from the scraping area.

7 Claims, 12 Drawing Sheets

U.S. PATENT DOCUMENTS

| | | | |
|---|---|---|---|
| 4,182,444 A | 1/1980 | Fisher | |
| 4,189,046 A | 2/1980 | Ward et al. | |
| 4,359,150 A | 11/1982 | Bowman et al. | |
| 4,529,084 A | 7/1985 | Zhang | |
| 4,533,035 A | 8/1985 | Reiter | |
| 4,533,036 A | 8/1985 | Gordon | |
| 4,541,523 A | 9/1985 | Stockton | |
| 4,633,999 A | 1/1987 | Perneczky | |
| 4,639,967 A | 2/1987 | Bordignon | |
| 4,641,852 A | 2/1987 | Kerst et al. | |
| 4,658,949 A | 4/1987 | Reicks | |
| 4,694,952 A | 9/1987 | Meijer | |
| 4,696,389 A | 9/1987 | Schwarze | |
| 4,768,644 A | 9/1988 | Cromm | |
| 4,779,716 A | 10/1988 | Gordon | |
| 4,792,154 A | 12/1988 | Kerst et al. | |
| 4,838,409 A | 6/1989 | Rappen | |
| 4,850,474 A | 7/1989 | Schwarze | |
| 4,854,443 A | 8/1989 | Gordon | |
| 4,887,329 A | 12/1989 | Perneczky | |
| 4,953,689 A | 9/1990 | Peterson et al. | |
| 4,962,845 A | 10/1990 | Gibbs | |
| 5,011,002 A | 4/1991 | Gibbs | |
| 5,014,844 A | 5/1991 | Anttonen | |
| 5,016,746 A | 5/1991 | Gibbs | |
| 5,031,750 A | 7/1991 | Barnes | |
| 5,082,106 A | 1/1992 | Schwarze | |
| 5,088,965 A | 2/1992 | Swinderman et al. | |
| 5,114,000 A | 5/1992 | Rappen | |
| 5,222,588 A | 6/1993 | Gordon | |
| 5,301,797 A | 4/1994 | Hollyfield, Jr. et al. | |
| 5,518,107 A | 5/1996 | Schwarze | |
| 5,573,102 A | 11/1996 | Puchalla | |
| 5,692,595 A | 12/1997 | Gilbert | |
| 5,797,477 A | 8/1998 | Veenhof | |
| 5,826,700 A | 10/1998 | Brink | |
| 5,950,803 A | 9/1999 | Schwarze | |
| 6,041,913 A | 3/2000 | Dolan | |
| 6,076,656 A | 6/2000 | Mat | |
| 6,082,524 A | 7/2000 | Brink | |
| 6,152,290 A | 11/2000 | Mott et al. | |
| 6,179,114 B1 | 1/2001 | Brink | |
| 6,279,727 B1 | 8/2001 | Waalkes et al. | |
| 6,283,274 B1 | 9/2001 | Dolan et al. | |
| 6,296,105 B1 | 10/2001 | Carnes | |
| 6,454,080 B1 | 9/2002 | Brink | |
| 6,581,754 B1 | 6/2003 | Law | |
| 6,681,919 B1 | 1/2004 | Brink | |
| 6,749,725 B1 | 6/2004 | Isometsä et al. | |
| 6,823,983 B1 | 11/2004 | DeVries | |
| 6,874,616 B1 | 4/2005 | DeVries et al. | |
| 2003/0066738 A1 | 4/2003 | Veenhof | |

FOREIGN PATENT DOCUMENTS

| | | |
|---|---|---|
| DE | 34 02 407 A1 | 7/1985 |
| EP | 0 254 977 A1 | 2/1988 |
| FR | 2 590 243 A1 | 11/1985 |
| GB | 2 290 276 A | 12/1995 |
| WO | WO 2000/78650 A1 | 12/2000 |

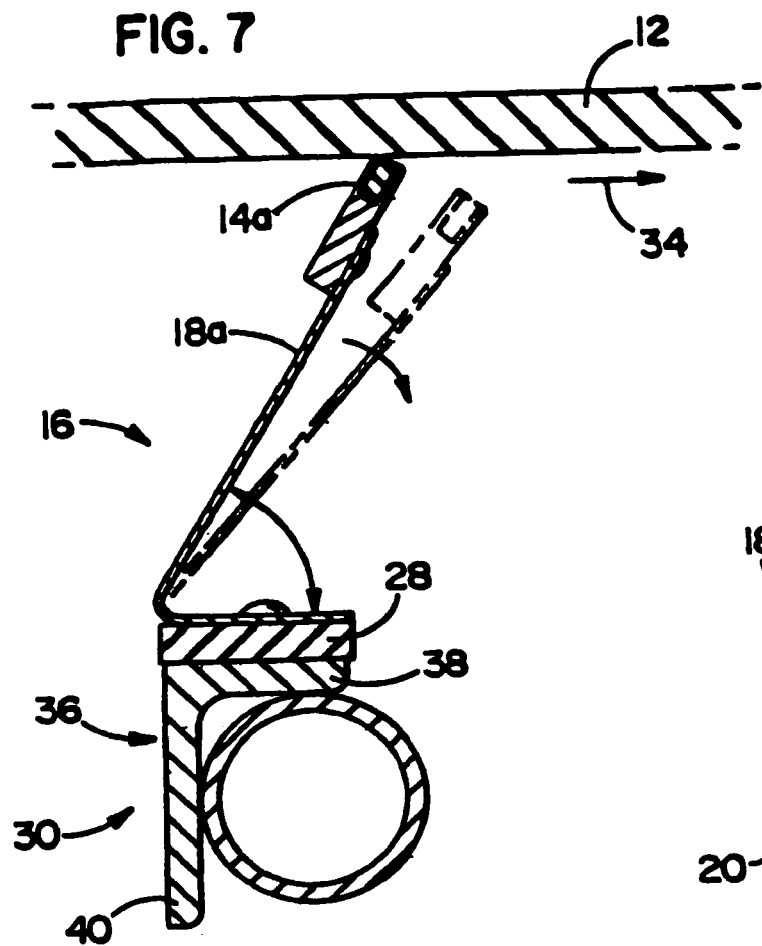
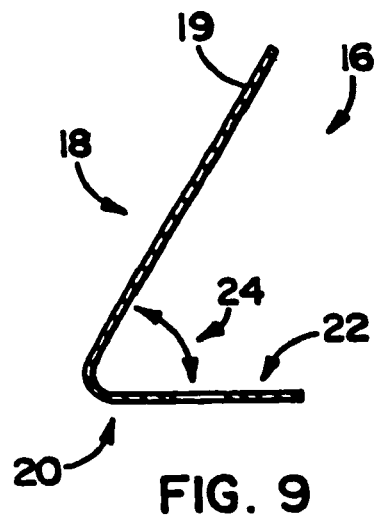
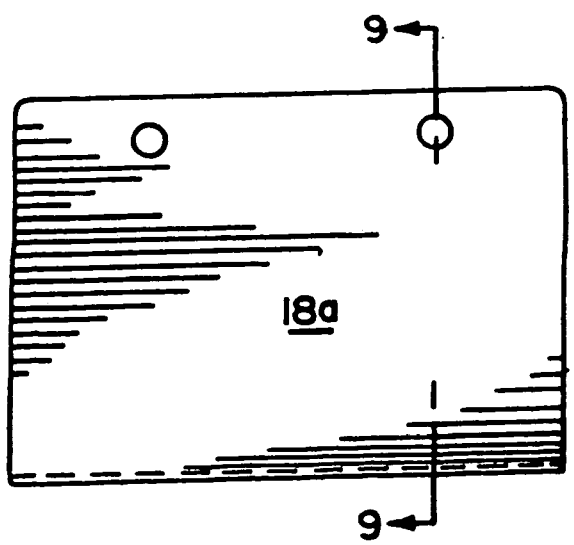

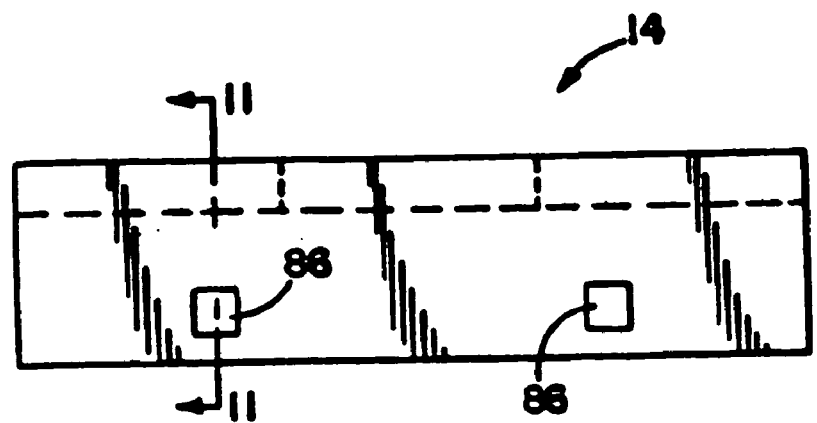
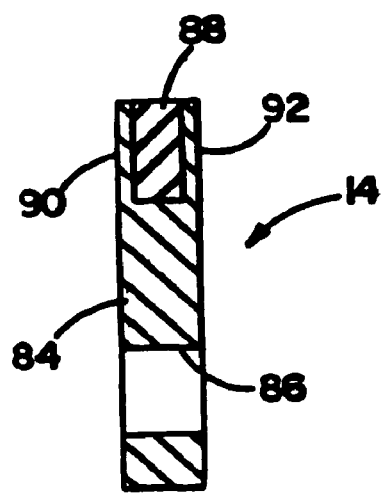
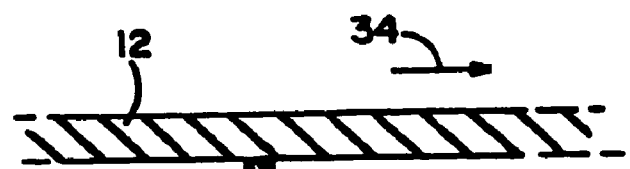
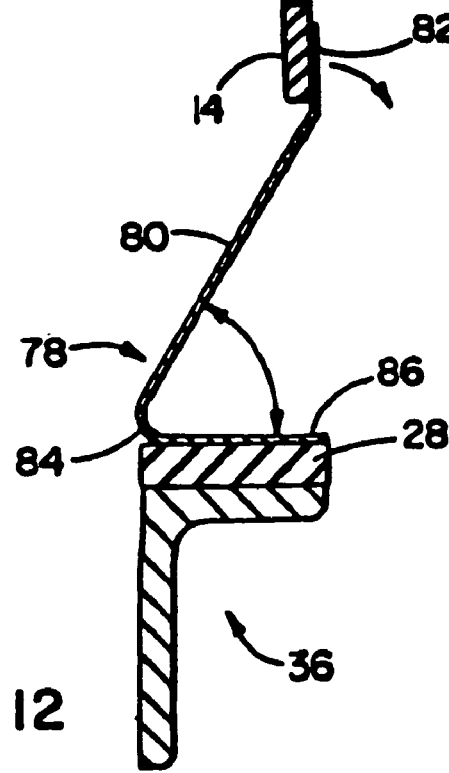
FIG. 10
FIG. 11
FIG. 12

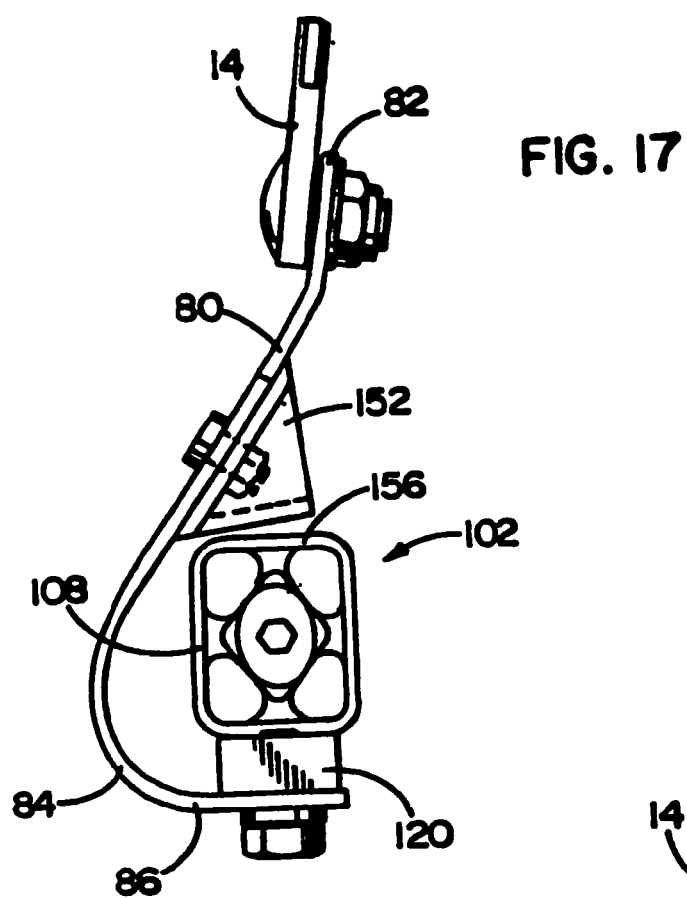
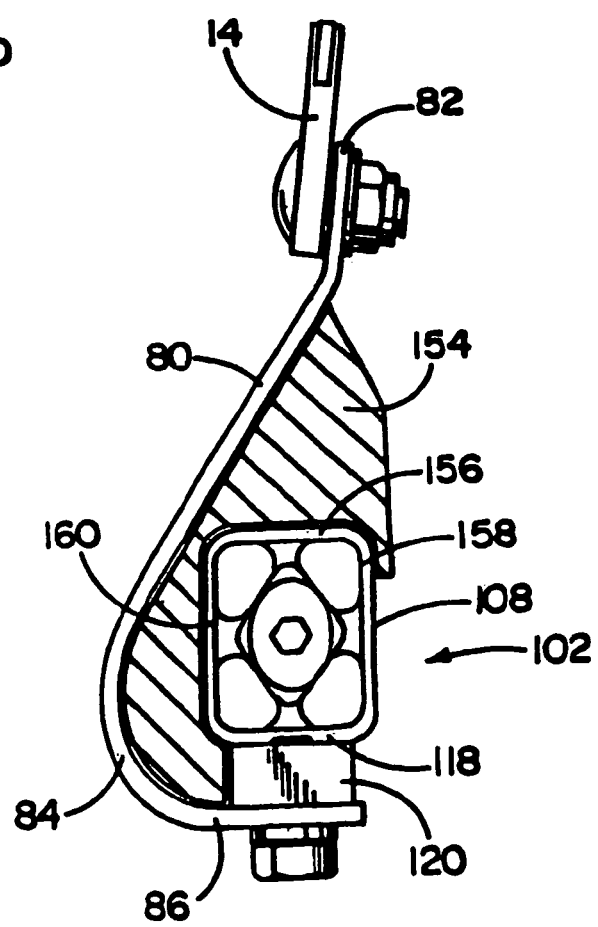

CONVEYOR BELT CLEANING SYSTEM

CROSS-REFERENCE TO RELATED APPLICATION

This is a continuation-in-part of prior application Ser. No. 10/270,813, filed Oct. 15, 2002 now U.S. Pat. No. 6,823,983.

FIELD OF THE INVENTION

The invention relates to belt cleaning systems for conveyor belts and, more particularly, to resilient blade mounts for secondary belt cleaning systems.

BACKGROUND OF THE INVENTION

Cleaners for conveyors that utilize a scraping element to remove debris and other materials from conveyor belts are well known. These conveyor belts often include metallic splices extending across the belt that run past the scraper blades during conveyor belt operations. The scraper blades are typically biased into engagement with the belt to allow them to resiliently shift away from the belt when surface irregularities on the belt are encountered such as due to the aforementioned metallic splices.

Generally, the goal of keeping the scraper blade in substantially constant contact with the belt to improve cleaning thereof is in competition with the need to allow the blades to shift away from the belt to avoid taking the full brunt of impacts with metallic splices and the like which can cause the scraper blades to rapidly wear. In heavier duty applications, this problem can be exacerbated by the use of thicker, more robust fasteners which create higher impact loads on the cleaning blade.

Another problem for keeping the blade in contact with the belt is its angle of attack relative to the belt. Generally, scalping angles where the blade leans forwardly or in the upstream direction as the belt travels downstream so as to form an obtuse angle with the belt surface upstream therefrom presents the most problems. With this aggressive angling of the blade, it will receive relatively high impact forces when encountering the splices or other carry-back materials on the belt. Also, these high impact forces can cause the blade to vibrate or "chatter" along the belt surface rather than staying in conformance with the belt reducing the cleaning efficiency of the blade. Catastrophic failure of the cleaner blade mounting components utilizing scalping angles is also of greater concern. Similarly, while a cleaning blade extending normal or vertically with respect to the belt surface to be cleaned is more desirable for cleaning, cleaning systems employing blade mounting members that only provide for vertical blade movements still can create high impact forces, particularly on belt splices which can cause excessive wear and ultimate failure of the splices.

By contrast, having the blade extending in the downstream direction so that it forms an acute angle with the belt surface upstream therefrom reduces the impact loading on the blade but can also create difficulties in keeping the blade in conformance with the belt surface. Unless the blade is heavily tensioned into engagement with the belt, when the blade encounters even minor surface irregularities or variations in contour on the belt surface it will undesirably shift too far away from the belt. In other words, the sensitivity of the blade is not optimized in terms of its ability to stay in substantial contact with the belt surface when encountering relatively small irregularities in the surface of the belt that do not cause undue wear of the blade. Accordingly, when these irregularities are due to small pieces of material being carried back on the return run of the belt, the acutely angled blade may not be effective in scraping these off the belt surface. In such instances, it is better for the blade to stay tightly engaged with the belt for wiping the belt clean rather than to resiliently shift away therefrom. Another problem with the acute angle of the blade is that any of the blade mounts extending at the same angle will have the material scraped from the conveyor belt surface falling thereon. If this material build-up increases, it can impair the ability of the scraper blade to effectively clean the belt surface.

For resiliently urging the scraper blades into engagement with the belts, the blade mounts can have pivot biasing mechanisms associated therewith. Generally, these biasing mechanisms have been characterized by their complexity in an effort to enhance cleaning efficiency while reducing blade wear. Particularly, the pivot biasing mechanisms typically employ several pivots and linkages between the conveyor frame and the blade, as well as separate springs such that there are several components which makes these systems more susceptible to wear and failure, see e.g. U.S. Pat. No. 3,952,863 to Schattauer.

Cleaning systems are also known that employ resilient bodies such as of polymeric or elastomeric material as the primary mechanism to resiliently hold the blade in tight engagement with the belt. These types of conveyor systems generally will not be effective in high temperature conditions where the material that is being conveyed and/or the surrounding environment can be at elevated temperatures, such as conveyor belts running at asphalt and cement facilities. In high temperatures, e.g. above 180 degrees Fahrenheit, the polymeric or elastomeric materials can degrade so that the biasing force provided by these bodies dissipates rapidly over time. To this end, material creep for these materials can become a serious problem particularly in high temperature environments where creep can be accelerated. Likewise, the ability of polymeric or elastomeric creep materials undergoing accelerated creep to apply the same bias force to the blade over time will be compromised, as they may lose their ability to return to their original, relaxed configuration with excessive applied stress over long time durations.

Accordingly, there is a need for a conveyor belt cleaner that is better optimized in terms of its cleaning efficiency and the wear resistance of its cleaning blade. Further, a less complex mount for a cleaning blade is needed. A conveyor cleaner system that can be used in high temperature environments would also be desirable.

Another problem with belt cleaning systems employing resilient biasing mechanisms for urging the cleaning blade into scraping engagement with the belt is the impact force with which the blade is returned into engagement with the belt after shifting away therefrom. In many prior systems, it is very difficult to quickly reengage the belt with a cleaning blade that has resiliently shifted away therefrom without returning back into engagement with the belt with an unduly high impact force. The blade impacting against the splice fasteners with high force can damage these fasteners decreasing splice life.

Accordingly, there is a need for a conveyor belt cleaning system that resiliently biases the blade into engagement with the belt and quickly brings the blade back into engagement with the belt while minimizing the return impact force of the blade against the belt and fastener damage caused thereby.

SUMMARY OF THE INVENTION

In accordance with one aspect of the invention, a cleaner for a conveyor belt is provided having a blade mount member for resiliently keeping a scraper blade in engagement against the belt. The blade mount member has a layback portion and a lower arcuate portion. The layback portion has the scraper blade secured to an upper end thereof and extends at a layback angle toward the belt with the lower arcuate portion spaced upstream of the upper end of the layback portion. The lower arcuate portion flexes during conveyor belt operations for controlled deflection of the layback portion that reduces loading thereon and substantially keeps the scraper blade engaged against the belt.

The use of a layback portion and a lower arcuate portion of the blade mount member presents several advantages for the present blade mount. In one aspect, the arcuate portion of the blade mount has a predetermined radius of curvature that decreases when flexed, which causes the layback portion to shift away from the conveyor belt. Thus, the displacement of the layback portion is not reflected in a corresponding amount of displacement of the flexible arcuate portion, reducing the stress in the blade mount. In other words, the flexible arcuate portion of the mount member avoids a static pivot point for the blade mount with the consequent highly localized stresses thereat, as instead, the radius of curvature of the arcuate portion changes and is reduced when the blade is loaded during its scraping engagement with the running conveyor belt. This effect is further enhanced by the relatively long length of the layback portion or arm of the blade mount member so that small decreases in the radius of the arcuate portion allow the blade to deflect sufficiently to reduce the force of high impact loads thereagainst.

Having the blade secured to the upper end of the layback portion or arm of the blade mount member allows it to more easily shift away from the belt, especially in the preferred form where the blade extends toward the belt with the same layback angle relative to the horizontal as the layback arm. As the blade is deflected, it simultaneously shifts both rearwardly or horizontally and downwardly or vertically due to the configuration of the blade mount member having the arcuate portion spaced upstream from the upper end of the layback portion and the blade thereat. For controlling this displacement of the blade, the radius of curvature of the arcuate portion is larger than the thickness of the arcuate and layback portions. Preferably, the radius is approximately two to six times the thickness of these blade mount portions. In this manner, the spring stiffness of the blade mount member is sufficiently robust to maintain good blade-to-belt contact with the sizing of the layback arm minimizing excessive wear on the blade, even in abusive applications.

More particularly, in use the layback arm portion is spring loaded with a predetermined bias force. When the blade is tensioned into engagement with the belt, the arm pivots back so that the layback angle will decrease from its size when the blade mount is relaxed. In one form, each degree of decrease of the layback angle increases the spring load of the layback arm by on average approximately eight pounds of force. For example, tensioning the blade into the belt can cause a decrease of approximately five degrees in the layback angle of the arm in its non-pivoted or relaxed configuration so that the arm and blade attached thereto are spring loaded with approximately forty pounds of force into engagement with the belt. Accordingly, as the blade undergoes normal wear, the spring load or bias force of the blade mount member keeps the blade biased into engagement with the belt surface as the layback angle can still increase back toward the relaxed layback angle of the mount while still maintaining a bias force on the blade to keep it in conformance with the belt surface.

In accordance with another form of the invention, a conveyor belt cleaning assembly is provided which includes a resilient blade mount. The blade mount preferably is of a shape-retentive metal material and secured to a rigid support of a frame for the conveyor belt. The blade mount is configured for resiliently biasing the scraper blade into engagement with the conveyor belt running in high temperature environments. As such, the cleaning assembly includes a blade mount with a minimal number of components and avoids the use of resilient bodies such as of polymeric or elastomeric materials that serve as the primary biasing mechanism for urging the scraper blade into engagement with the belts. In this manner, the cleaning assembly is well-adapted for use in harsh applications, and particularly where high temperature conditions are prevalent. In high temperatures, the metal blade mount herein retains its ability to return to its original, relaxed configuration prior to that taken when biasing the blade into engagement with the belt despite exposure to high stresses over long time durations. To this end, in contrast to polymeric/elastomeric material the present metal blade mount does not experience material creep or stress relaxation problems that can adversely affect its ability to be shape-retentive. In other words, even with the blade biased or tensioned into the belt such that the blade mount is loaded as by deflection of the layback arm, the metal material of the mount will keep substantially the same bias force on the blade despite the stresses to which it is subjected.

More specifically, the metal blade mount preferably is of a unitary angled spring plate construction. In one form, the blade mount includes a layback portion that extends toward the conveyor belt, and a base portion that extends at a layback angle to the layback portion. The layback angle is predetermined so as to minimize material build-up on the layback portion, e.g. in a range between approximately 30 degrees and up to approximately 85 degrees, and most preferably approximately 60 degrees. As mentioned, once the blade is tensioned into engagement with the belt, the layback angle will decrease with the deflected mount then providing the blade a resilient bias force that stays substantially constant during belt operations, albeit undergoing fluctuations due to deflection of the arm and consequent changing of the angle when the blade encounters surface irregularities on the belt.

Resilient material can be provided between the metal blade mount and the support for cushioning the blade during conveyor belt operations. The resilient material is preferably selected to be resistant to degradation at temperatures up to approximately 450 degrees Fahrenheit In an alternative, the layback portion can include an upper or upturned end portion at the upper end thereof to which the scraper blade is secured. The upturned end portion extends normal to the conveyor belt for providing the scraper blade with an optimized angle of contact with the belt.

In another aspect of the present invention, a belt cleaning system is provided that includes a cleaning blade biased into scraping engagement with a conveyor belt and which employs a plurality of distinct resilient mounts for the blade. The resilient blade mounts absorb the energy of impacts against the blade during conveyor belt operations and provide for controlled release of the energy so that the impact forces of the blade reengaging with the belt are kept to a minimum. It is preferred that only two of the mounts be provided in the area of the cleaning blade while the remaining mounts be disposed at either or both ends of an elongate support extending across the belt. In this manner, the complexity of the mounting arrangement for the cleaning blade is minimized in the material path.

The preferred belt cleaning system is a secondary cleaner for being disposed under the conveyor belt along the return run thereof as between the head and tail pulleys of the conveyor belt drive system. The elongate support comprises a pole assembly extending below the conveyor belt and thereacross to ends that are laterally spaced from either side of the belt. A plurality of cleaning blades are aligned side-by-side and are biased into scraping engagement with the belt. A pair of resilient mounts are provided for each of the blades disposed under the belt and operably secured to the elongate support. Resilient biasing mechanisms are provided at the ends of the support out from under the conveyor belt. These biasing mechanisms allow for both rotary and vertical resilient shifting of the support and all of the blades mounted thereto.

BRIEF DESCRIPTION OF THE DRAWINGS

FIG. 7 is a cross-sectional view of the blade mount including a resilient cushion attached thereunder and showing deflection of the layback portion about the lower arcuate portion as the belt is running;

FIG. 8 is a front elevational view of the blade mount member showing the layback portion thereof including apertures at the upper end for securing the cleaner blade tip thereto;

FIG. 9 is cross-sectional view taken along line 9—9 of FIG. 8 showing the angled spring plate construction thereof;

FIG. 10 is an elevational view of the cleaner blade to be attached to the blade mount member;

FIG. 11 is a cross-sectional view taken along line 11—11 of FIG. 10 showing a harden tip portion held at the upper end of the cleaner blade member;

FIG. 12 is a cross-sectional view of an alternative form of a blade mount member in accordance with the present invention showing the layback portion having an upturned end portion at the upper end thereof to which the cleaner blade is secured;

FIG. 17 is schematic side view of the cleaning blade unit of FIG. 16 including a hard stop provided between the spring plate member and the torsion bias mechanism; and FIG. 18 is another schematic side view of the cleaning blade unit of FIG. 16 showing another version of a stop that is resilient and substantially takes up the space between the spring plate and torsion bias mechanism.

DETAILED DESCRIPTION OF THE PREFERRED EMBODIMENTS

Figure 1:
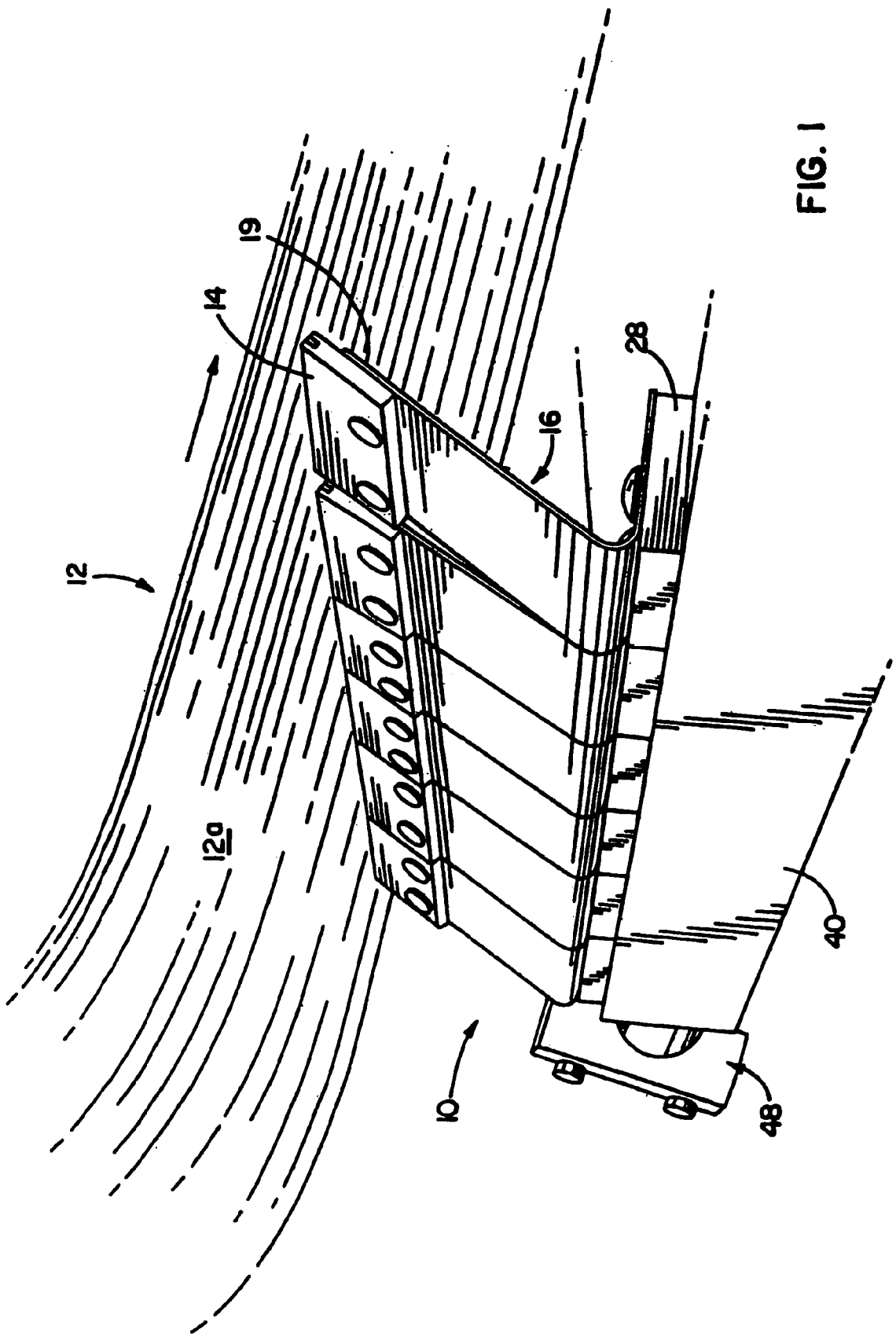
FIG. 1 is a perspective view of a conveyor belt cleaning assembly in accordance with the present invention showing a plurality of blade mounts each having a scraper blade attached to the upper end thereof that is biased into engagement with a conveyor belt.
Figure 2:
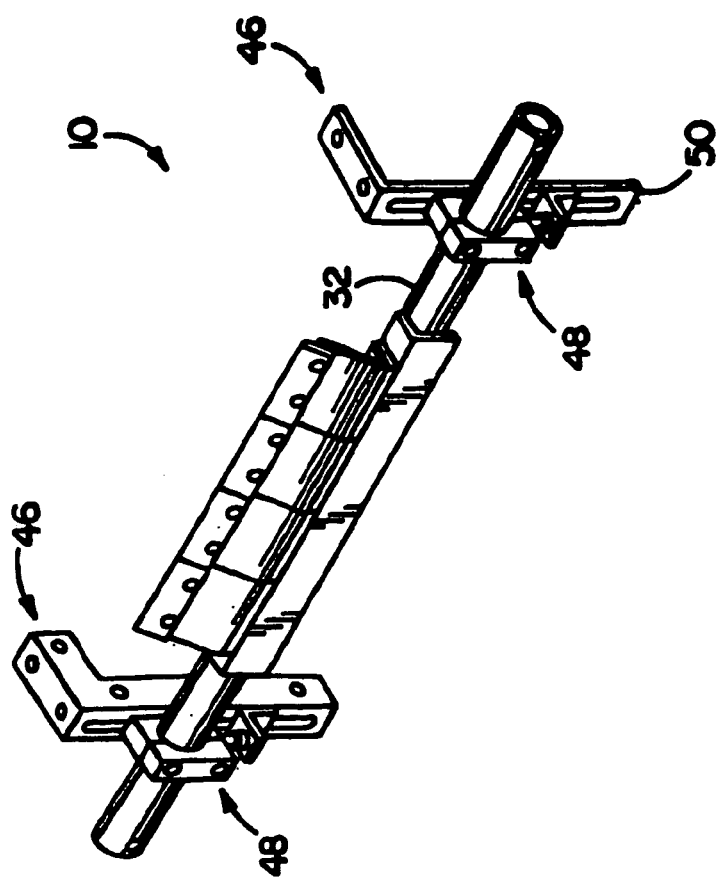
FIG. 2 is a perspective view of the conveyor belt cleaning assembly of FIG. 1 showing a rigid pole support assembly fixed to opposite side conveyor framing members with the blade mounts secured to the pole assembly intermediate the conveyor framing members.
Figure 3:
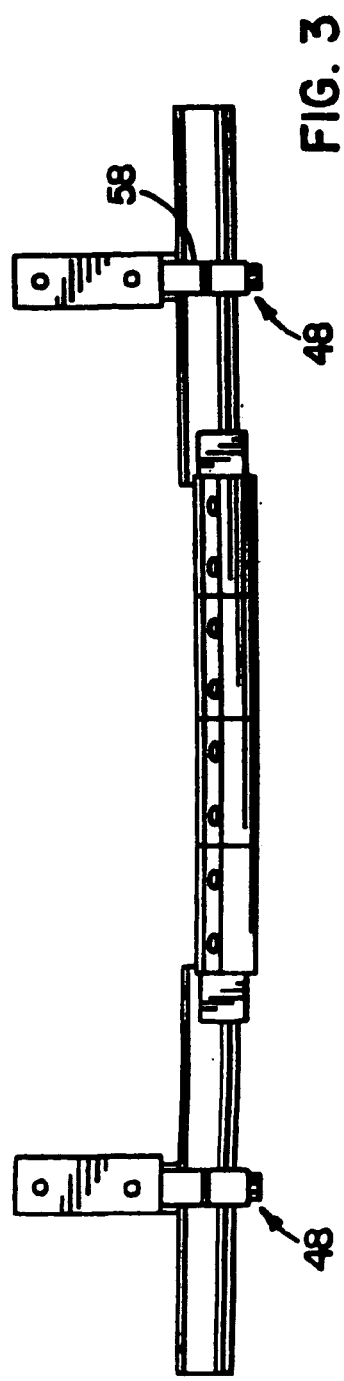
FIG. 3 is a plan view of the conveyor belt cleaning assembly of FIG. 2.
Figure 4:
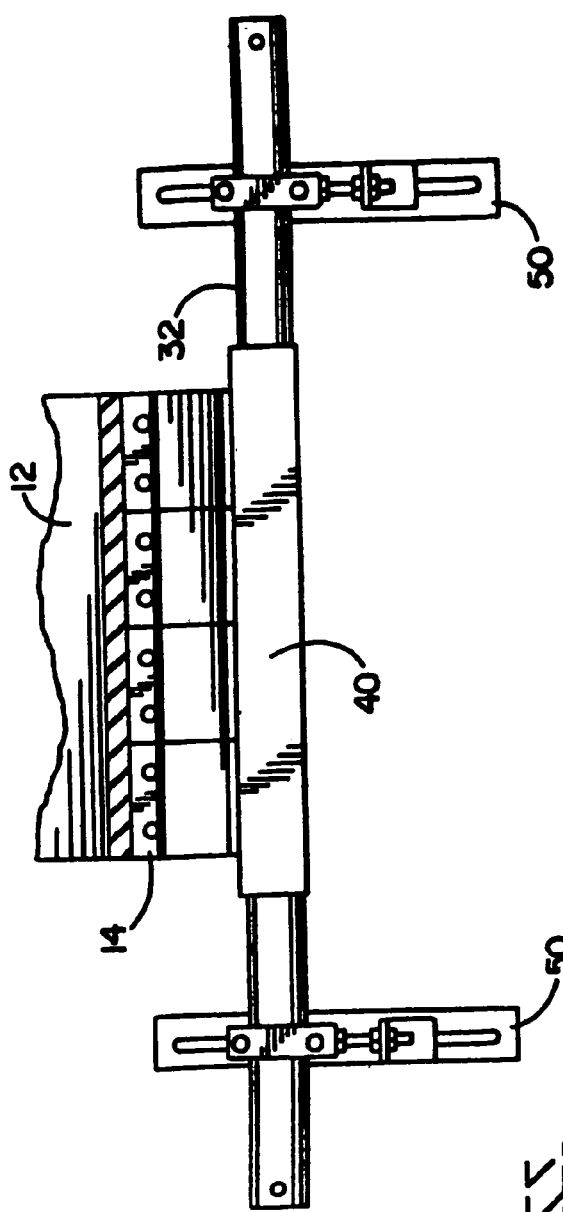
FIG. 4 is a front elevational view of the cleaning assembly of FIG. 2.
Figure 5:
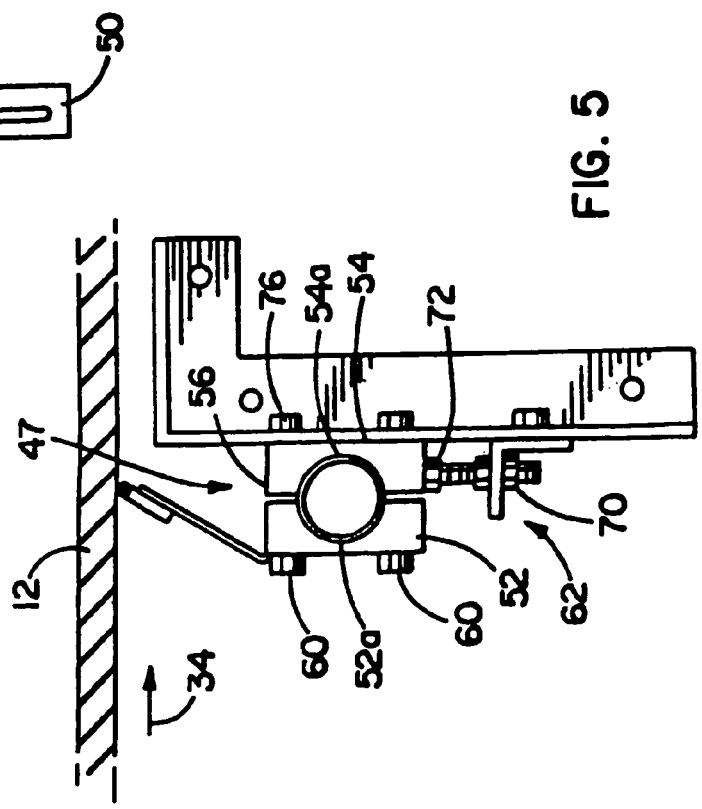
FIG. 5 is a side elevational view of the cleaning blade assembly showing a split block that provides for rotary adjustment of the pole assembly.
Figure 6:
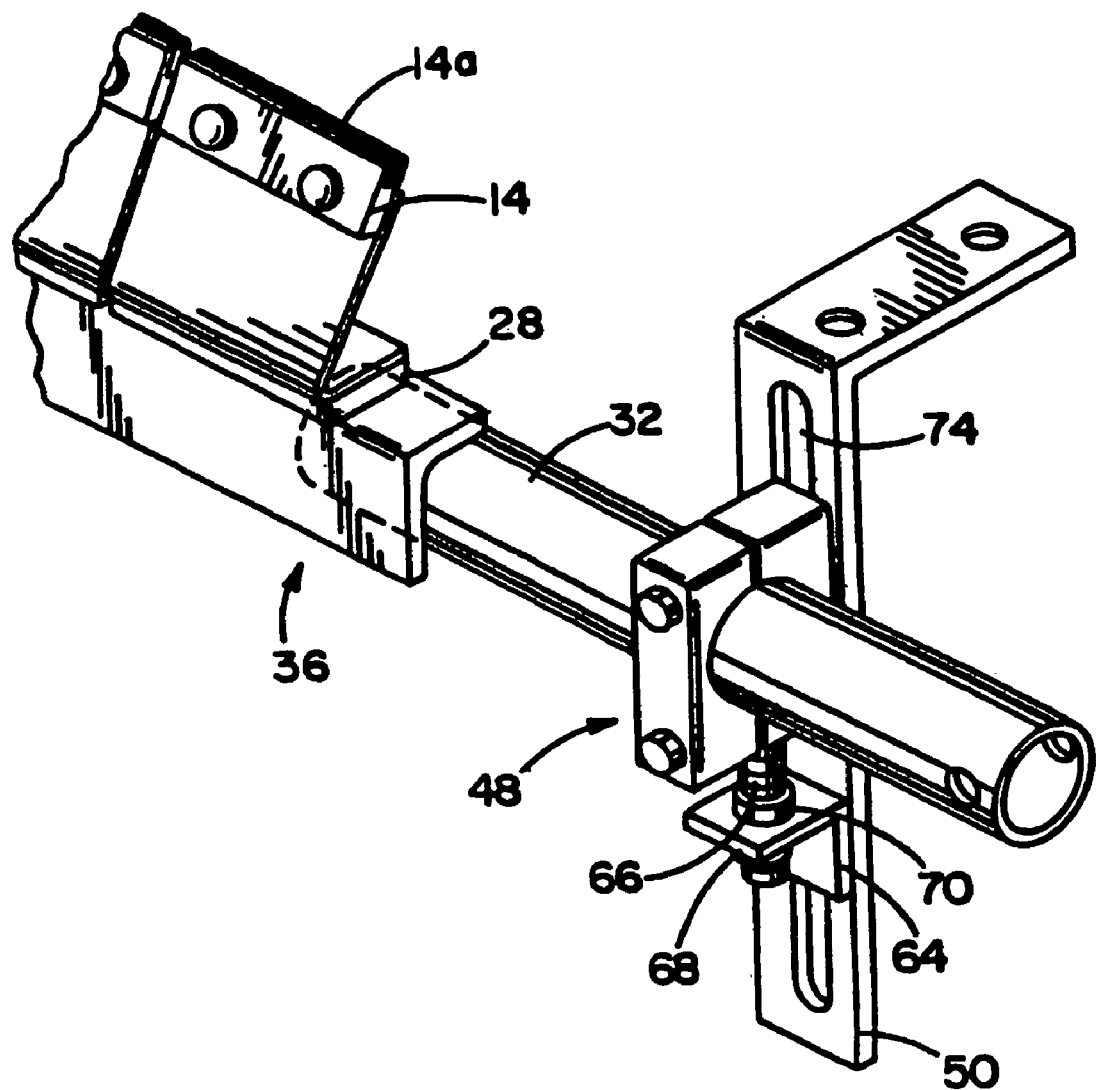
FIG. 6 is an enlarged perspective view of one of the side frame members showing a vertical adjustment slot for adjusting the tension of the blade in engagement with the belt.

In FIG. 1, a cleaning assembly 10 for a conveyor belt 12 in accordance with the present invention is illustrated. The cleaning assembly 10 includes a belt cleaner having a scraper blade 14 that is attached to a blade mount member 16 which resiliently keeps the blade in engagement with the belt 12 as it is running. The blade mount member 16 is characterized by its ability to keep the blade 14 in substantially constant contact with the surface 12a of the conveyor belt 12 despite surface irregularities, i.e. deviations from a smooth, flat surface, that may be present thereon, while still allowing the blade 14 to resiliently shift away from the belt 12 when necessary to avoid taking the full brunt of high-impacts due to such surface irregularities. In this manner, the blade mount 16 is well-adapted to provide optimal cleaning efficiencies for the present cleaning assembly 10, and at the same time minimizes wear on the scraper blade 14 to increase the life thereof.

As can be seen best in FIG. 9, the blade mount member 16 has a layback portion 18 and a lower arcuate portion 20 which flexes to allow deflections of the layback portion 18 which, in turn, shifts the blade 14 attached thereto to and from the belt 12 as it is running. The layback portion 18 extends obliquely relative to the horizontal and the conveyor belt surface 12a running thereabove. More particularly, the arcuate portion 20 is disposed upstream of the upper end 19 of the layback portion 18 such that the layback portion 18 extends upwardly toward the belt 12 from the arcuate portion 20 and rearwardly or downstream relative to the belt 12 to form an acute angle with the belt surface 12a upstream therefrom. Thus, when the blade 14 is impacted, it is simultaneously deflected back horizontally and vertically downwardly as the arcuate portion 20 flexes and the layback portion 18 leans further rearwardly.

In the preferred and illustrated form, the blade mount member 16 is of a unitary construction such that the layback portion 18 and arcuate portion 20 are part of a single piece of metal material having an angled spring plate construction. The material for the spring plate blade mount can be spring steel, such as a hardened 410 stainless steel material. The preferred unitary metal blade mount 16 that resiliently biases the blade into engagement with the belt 12 is of particular advantage in situations where the belt 12 is operated in high temperature conditions. In these harsh conditions, the spring steel blade mount 16 is able to retain the bias force for the blade 14, as opposed to those blade mounting systems that rely on rubber or other resilient polymers to provide this force. The steel material will not experience material creep problems and thus will stay shape retentive despite exposure to high temperatures and high loading or stresses thereon so that any loss of bias force provided to the blade 14 by the mount 16 over long durations of conveyor belt operations will be kept to a minimum. It is manifest that other constructions employing the layback and arcuate portions 18 and 20 of the blade mount member 16 can be utilized such as by having these be separate components; however, the unitary or one-piece construction illustrated herein is preferred to reduce the complexity of the present blade mount 16.

The blade mount member 16 preferably also includes a base portion 22 with the arcuate portion 20 interconnecting the layback portion 18 and base portion 22 at a predetermined angle 24 therebetween. As shown, the base portion 22 extends generally horizontally and rearwardly or downstream from the arcuate portion 20, although such horizontal orientation is adjustable as described hereinafter. Thus, the angle 24 can substantially coincide with the layback angle at which the layback portion or arm 18 of the unitary angled spring plate member 16 extends toward the belt surface 12a. However, since the layback angle is referenced with respect to the horizontal, the angle 24 may vary slightly from the layback angle if the base 22 is adjusted to be slightly pitched from the horizontal, although these angles will be referred to interchangeably herein.

The predetermined layback angle 24 is carefully selected in conjunction with the stiffness or resilience of the spring plate member 16 to keep the blade 14 in substantial conformance with the belt surface 12a despite loading thereof such as due to surface irregularities along the belt surface 12a. The layback angle 24 and stiffness of the spring plate member 16 in conjunction with the length of the arm 18 allow carefully controlled movement of the blade 14 away from the belt surface 12a as such loads become more excessive, such as due to projecting metal fasteners of any belt splices that may be encountered by the blade 14. In this way, damage to the belt splices is substantially minimized.

Also, the layback angle 24 is such that the flat upwardly facing surface 18a of the layback arm 18 is not susceptible to excessive material accumulation thereon as scraped from the belt surface 12a, which can adversely affect the cleaning efficiency of the blade 14. By way of example, the layback angle 24 can be approximately 60 degrees which is akin to that of some chutes that feed material onto conveyor belts. In this manner, when the scrapped material from the belt surface 12a falls onto the flat surface 18a of the blade mount layback arm 18, it will slide off therefrom rather than accumulate and build-up thereon. In addition to the illustrated 60 degree angle, layback angles 24 that are in the range of approximately 30 degrees to approximately 85 degrees are also contemplated herein.

Accordingly, the configuration and sizing of the layback and arcuate portions 18 and 20 of the blade mount member 16 provide improved conformance of the cleaner blade 14 with the belt surface 12a while allowing the layback portion 18 to resiliently deflect as necessary when encountering excessive applied loading to the blade 14 as the belt 12 is running. In other words, the layback and arcuate portions 18 and 20 of the present blade mount member 16 provide it with a robust configuration without creating undue wear at the blade 14. Also, as the blade 14 undergoes normal wear at the upper scraping tip 14a thereof, the force applied by the blade mount 16 is able to keep the blade tip 14a in close conforming contact with the belt surface 12a, as described more fully hereinafter.

Figure 7A:
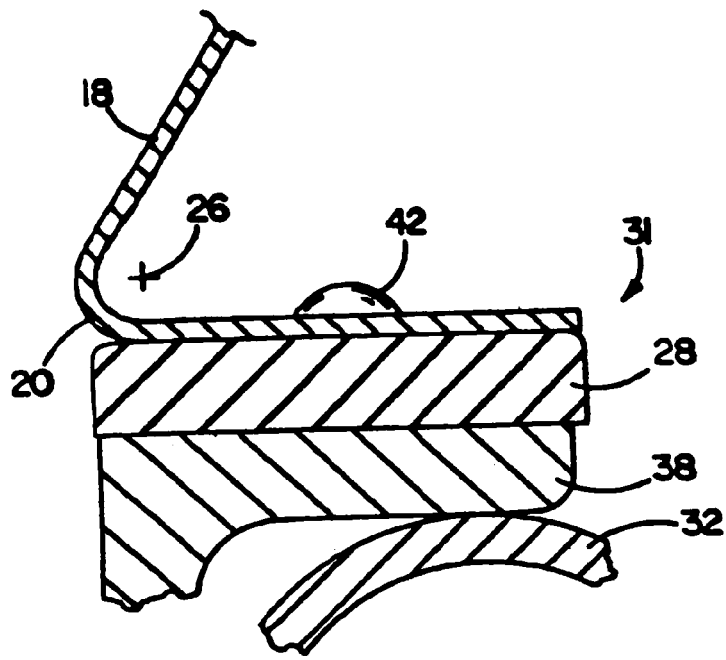
FIG. 7A–7C are enlarged fragmentary cross-sectional views similar to FIG. 7 showing the changing radius of curvature of the arcuate portion as the blade is loaded.
Figure 7B:
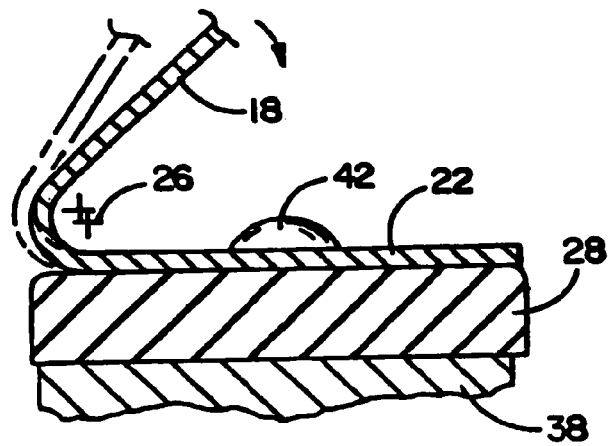
Figure 7C:
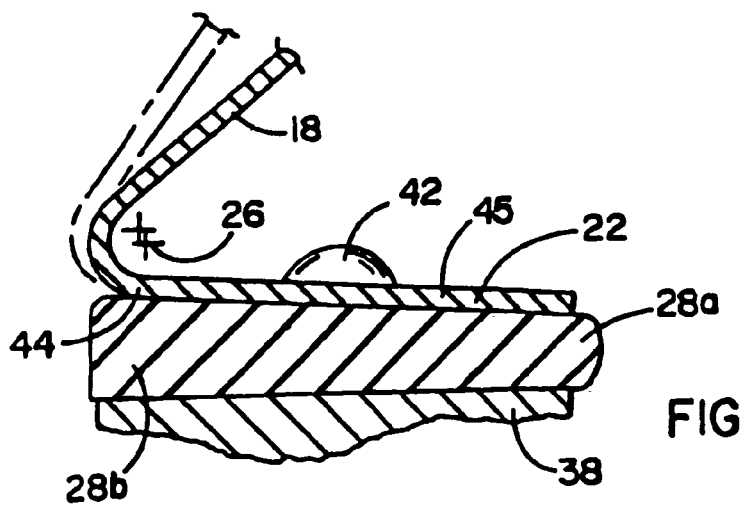

Referring to FIGS. 7A–7C, it can be seen that the radius of curvature of the arcuate portion 20 as denoted by point 26 changes as the blade 14 is loaded. Comparing the radius at point 26 in FIG. 7A where the belt 12 is not running and the blade 14 has yet to be tensioned into engagement with the belt 12 to the radius at points 26 in FIGS. 7B and 7C where the blade 14 is tensioned into the belt 12 and the belt 12 is running, it can be seen that the radius of curvature decreases as the blade 14 is loaded and the layback portion 18 shifts toward the base portion 22 decreasing the angle 24 therebetween. The radius of the arcuate portion 20 is significantly smaller than the length of the layback arm 18 so that relatively small flexing movements of the arcuate portion 20 generate significantly larger displacements of the blade 14 at the upper end of the relatively long arm 18, e.g. approximately 4 inches in length. Thus, the stresses or strains in the blade mount member 16 are significantly decreased versus, for example, those mounting assemblies that include members that shift by an amount generally corresponding to the displacement of their blades.

Further, the stiffness and resiliency of the preferred angle spring plate construction of the blade mount member 16 allows the resilient shifting of the blade 14 to be highly controlled so that it only deflects by an amount needed to minimize loading thereon, as has been mentioned. In this regard, the radius of curvature of the arcuate portion 20 is larger than the thickness of the layback arm 18 and arcuate portion 20, which when formed as a unitary angled spring plate member with the base portion 22 are of constant thickness. The large size of the radius of curvature of the arcuate portion 20 relative to the thickness of the blade mount member 16, and particularly the arm and arcuate portions 18 and 20 thereof provides the blade mount member 16 configured in its relaxed state with its preferred 60 degree layback angle 24 a stiffness that is tailored to provide the blade 14 with substantially constant blade-to-belt contact for optimized cleaning efficiencies. For each degree that the relaxed layback angle is decreased, the spring loading on the blade 14 is increased by approximately eight pounds, on average. At the same time, the layback angle 24 along with the relatively long length of the layback arm 18 allows the blade 14 to deflect sufficiently when excessive loading is applied thereto via relatively small deflections of the arcuate portion 20 to minimize blade wear, as previously discussed.

By way of example and not limitation, with respect to the preferred unitary, angled spring plate construction of the blade mount member 16, the thickness of the spring plate member 16 can be approximately 0.062 inch and the radius of the lower arcuate portion 20 can be approximately 0.25 inch. The vertical height of the member 16 measured from the bottom of the base 22 to the top of the layback arm 18 is approximately 4.0 inches with the base 22 having a length measured from its transition with the arcuate portion 20 to the downstream free end thereof of approximately 2.0 inches. With the above dimensions, the total length of the spring plate member 16 as measured along the surface from the free end 19 of the arm 18 about the arcuate portion 20 and to the free end of base 22 is approximately 6.62 inches. With these dimensions, approximately 7 degrees in reduction in the angle 24 generates approximately 0.25 inch of vertically downward displacement of the, blade 14. And a five degree reduction such as can occur with tensioning of the blade 14 into the belt 12 as described hereinafter will generate an approximately forty pound bias force on the blade 14 via the deflected layback arm 18.

To minimize blade chatter, a resilient dampening material 28 can be attached between the blade mount member 16 and a rigid support assembly 30 therefor. In the preferred form, the resilient material 28 is fixed between the base 22 of the angled spring plate blade mount 16 and the rigid support 30 thereunder to provide the mount member 16 with a resilient base assembly 31. In this regard, the resilient material 28 is selected according to the application in which the cleaning assembly 10 herein is to be employed. In lower temperature applications, the material can be a commercial grade of neoprene rubber, whereas for higher temperature applications for which the metal spring plate mount member 16 is especially well-suited, the material 28 can be in the form of a silicone pad secured between the mount member 16 and support assembly 30 which is resistant to degradation up to temperatures of approximately 450 degrees Fahrenheit.

The resilient pad 28 allows the present cleaning assembly 10 to be better employed as a primary cleaner at the discharge head pulley of a conveyor belt system. Because the blade 14 of the primary cleaner is engaged against the belt 12 as it travels around the head pulley, there is less give with the blade 14 tensioned into the belt 12 and blade chatter can be more problematic. As such, the cleaning assembly 10 herein is best employed as a primary cleaner when the resilient pad 28 is utilized under the blade mount member 16 so as to better maintain conformance of the blade 14 against the conveyor belt 12 with a minimum of chatter. By contrast, where the cleaning assembly 10 is used as a secondary cleaner along the return run of the conveyor belt 12 downstream from the head pulley, the use of the resilient pad 28 is more optional.

The cleaning assembly 10 herein preferably includes several blade mount members 16 each including a scraper blade 14 secured thereto so as to extend for substantially the full width of the conveyor belt 12 traveling thereover. In this manner, the full extent of the width of the belt 12 is scraped clean by the blades 14 while allowing for more localized deflections of the blades 14 as they encounter irregularities that do not necessarily extend across the full width of the belt 12. Accordingly, while one of the blades 14 may be deflected downwardly due to an impact therewith, the other blades 14 can remain in tight engagement with the belt surface 12a.

Referring next to FIGS. 2–6, to secure the plurality of the blade mount members 16 under the conveyor belt 12, the support assembly 30 can be a known pole assembly having a pole member 32 extending underneath the belt transverse to the downstream running direction 34 thereof, and an elongate right-angle bracket 36 which its legs 38 and 40 secured as by welding to the top and front side of the pole 32, respectively. The blade mount members 16 are secured to the upper leg 38 as by bolting of either the base portion 22 thereto or the resilient base assembly 31 thereto (FIGS. 7 and 7A–7C).

The width blade mount members 16 can be approximately 5.75 inches so that preferably two bolts 42 are used to secure them to the pole assemblies 30. The bolts 42 are disposed generally intermediate the free end of the base 22 and the upstream end of the arcuate portion 20. The bolts 42 can provide for a pivot location for the blade mount member 16, as shown in FIG. 7C. To this end, when excessive loads are encountered by the blade 14, not only does the layback arm 18 deflect rearwardly and downwardly, but the forward portion 44 of the base 22 can lift or pivot up in a direction away from the resilient pad member 28 or toward the belt 12 while the rear portion 45 pivots downwardly compressing the pad 28 thereunder, as shown. The resilient nature of the material of the pad 28 can accommodate this pivoting by bulging slightly at the rear end portion 28a of the pad slightly out beyond the free end of the base 22, with the front end portion 28b of the pad 28 expanding to take up the space provided by the pivoting up of the base forward portion 44 so as to stay engaged therewith. Accordingly, by allowing the base 22 to rock or pivot about the bolts 42, the present blade mount member 16 is provided with an additional deflection allowance to keep the blade 14 in substantial conformance with the belt 12 despite surface irregularities along the belt surface 12a that it may encounter. With the forward portion 44 of the base 22 pivoted up toward the belt in a direction away from the resilient pad 28, the layback arm 18 is able to lean further back rearwardly for providing the blade 14 with a greater amount of deflection.

Continuing reference to FIGS. 2–6, the pole assembly 30 is supported at either end via side frame members 46 of the frame for the conveyor belt 12. The pole assembly 30 is adjustably supported at the opposite end portions by a rotational screw clamp adjustment mechanism 47 including split bearing blocks 48 that are themselves adjustable along slotted vertical plate portions 50 of the frame members 46, as will be described more fully hereinafter.

More particularly, the bearing blocks 48 include a pair of arc shaped members 52 and 54 that cooperate to define a cylindrical opening 56 through which the opposite ends of the pole 32 can extend. The split block members 52 and 54 are spaced by an adjustable gap 58 which can be reduced in size by appropriate tightening or loosening rotation of adjustment screws 60 extending through the block member 52 and threaded into tapped apertures (not shown) in block member 54. Accordingly, to rotationally adjust the pole 32 in the bearing blocks 52, the adjustment screws 60 are loosened to widen or increase the size of the gap 58 between the block members 52 and 54. The pole 32 can then be rotated in the openings 56. This allows the angle of the attack of the blade 14 relative to the belt surface 12a to be adjusted. In this regard, if the angle of attack is to be other than 60 degrees, i.e. corresponding to the layback angle 24, the pole 32 is rotated so that the upper bracket leg 38 is no longer perfectly horizontally oriented, along with the base 22 or base assembly 31 attached thereto. Once the desired angle of attack is achieved, the adjustment screws 60 are tightened so that the semi-circular arcuate surfaces 52a and 54a on the respective block members 52 and 54 are brought into tight clamping engagement with the cylindrical surface of the pole 32 rotationally fixing the pole assembly 30 in place.

With the angle of attack fixed as described above, the tension of the scraper blade 14 in engagement with the belt 12 can next be set by vertical adjustment of the cleaning assembly 10. For this purpose, a vertical screw adjustment mechanism 62 is provided. The vertical adjustment mechanism 62 includes a bracket member 64 that is fixed to the vertical plate portion 50 below the bearing blocks 48. An adjustment screw 66 extends through an opening in horizontal leg 68 of the bracket 64 and is threaded through nuts 70 engaged on either side of the leg 68 so that the distal upper end 72 abuts against the bottom surface of the bearing block 48, and specifically the block member 54 thereof. The block member 54 is slidingly secured to the frame plate 50 via fasteners including shanks extending from the block 54 through a vertical guide slots 74 of the frame plate portion 50. Enlarged fastener heads 76 on the shanks are disposed on the other side of the plate portion 50 from the block member 54 to keep it slidingly secured thereto.

Accordingly, to adjust the tension of the blade 14, the adjustment screw 66 is turned in the tightening direction causing it to advance through the bracket leg 68 with the abutment end 72 pushing the bearing block 48 upwardly, along with the support assembly 30, and the blade mounts 16 and associated blades 14 therewith. If the tension is excessive, the adjustment screws 66 are turned in the loosening direction to retract the screw 66 and abutment end 72 thereof, lowering the bearing block 48 accordingly. Generally, the angle 24 will be reduced by a small amount, e.g., 5 degrees, such as from the preferred 60 degrees to 55 degrees, with the blade 14 appropriately tensioned into engagement with the belt 12 due to slight bending or pivoting of the arm 18 toward the base 22. As mentioned, with the preferred and illustrated blade mount member 16 including an angle 24 of 60 degrees between the arm 18 and base 22, such a 5 degrees reduction will generate a bias force of approximately forty pounds on the blade 14 engaged with the belt 12, based on the spring force of approximately eight pounds per degree of layback angle reduction from the relaxed state provided by the blade mount member 16.

An alternative blade mount member 78 is depicted in FIG. 12. The blade mount member 78 is substantially the same as the blade mount member 16 except that the upper end of the layback portion 80 includes an upturned end or end portion 82 that extends substantially vertically or normal to the belt surface 12a so that the scraper blade 14 secured thereto has a more aggressive angle of attack relative to the belt 12 versus the layback angle provided by blade mount member 16.

Even with the more aggressive cleaning angle provided by blade mount 78, its configuration including the layback portion 80 and lower arcuate portion 84 provides many of the same advantages as the mount member 16. More particularly, the layback portion 80 extends toward the belt surface 12a at a preferred layback angle of approximately 60 degrees that it forms with the generally horizontally oriented base portion 86 thereof, interconnected to the layback portion 80 via the arcuate portion 84. The layback arm portion 80 allows the blade 14 to simultaneously shift both vertically and horizontally when loaded. The layback portion 80 is sized and the arcuate portion 84 is radiused such that relatively small angular changes between the layback portion 80 and the base portion 86 result in relatively large vertical displacements of the blade 14 without requiring excessive horizontal displacement thereof. Similarly, this vertical displacement of the blade 14 is achieved with relatively small incremental decreases in the radius of curvature of the arcuate portion 84 resulting in a lower strain on the blade mount member 78, as discussed with respect to blade mount member 16.

The preferred scraper blade 14 used with the blade mount members 16 and 78 herein will next be described. Referring to FIGS. 10 and 11, the scraper blade 14 has a generally rectangular body 84 such as of metal material. The blade body 84 has a pair of through apertures 86 disposed in the lower region thereof to allow for bolting to the blade mount members 16 and 78. As can be seen in FIG. 10, the blades 14 extend for substantially the full width of the blade mount members 16 and 78, and particularly the respective layback portion 18 and upturned portion 82 thereof. At the upper end region of the blade body 84, a tip 88 of hard material such as carbide is embedded thereat such that there are thinned portions 90 and 92 on either side of the hardened tip 88 with the flat tops of the tip 88 and the thinned portions 90 and 92 generally flush with each other, as best seen in FIG. 11. This hardened tip 88 of the blade body 84 provides the blade 14 with greater impact resistance to more readily allow the cleaner assembly 10 herein to be utilized with those conveyor belts 12 having mechanical and vulcanized splices therein.

Figure 13:
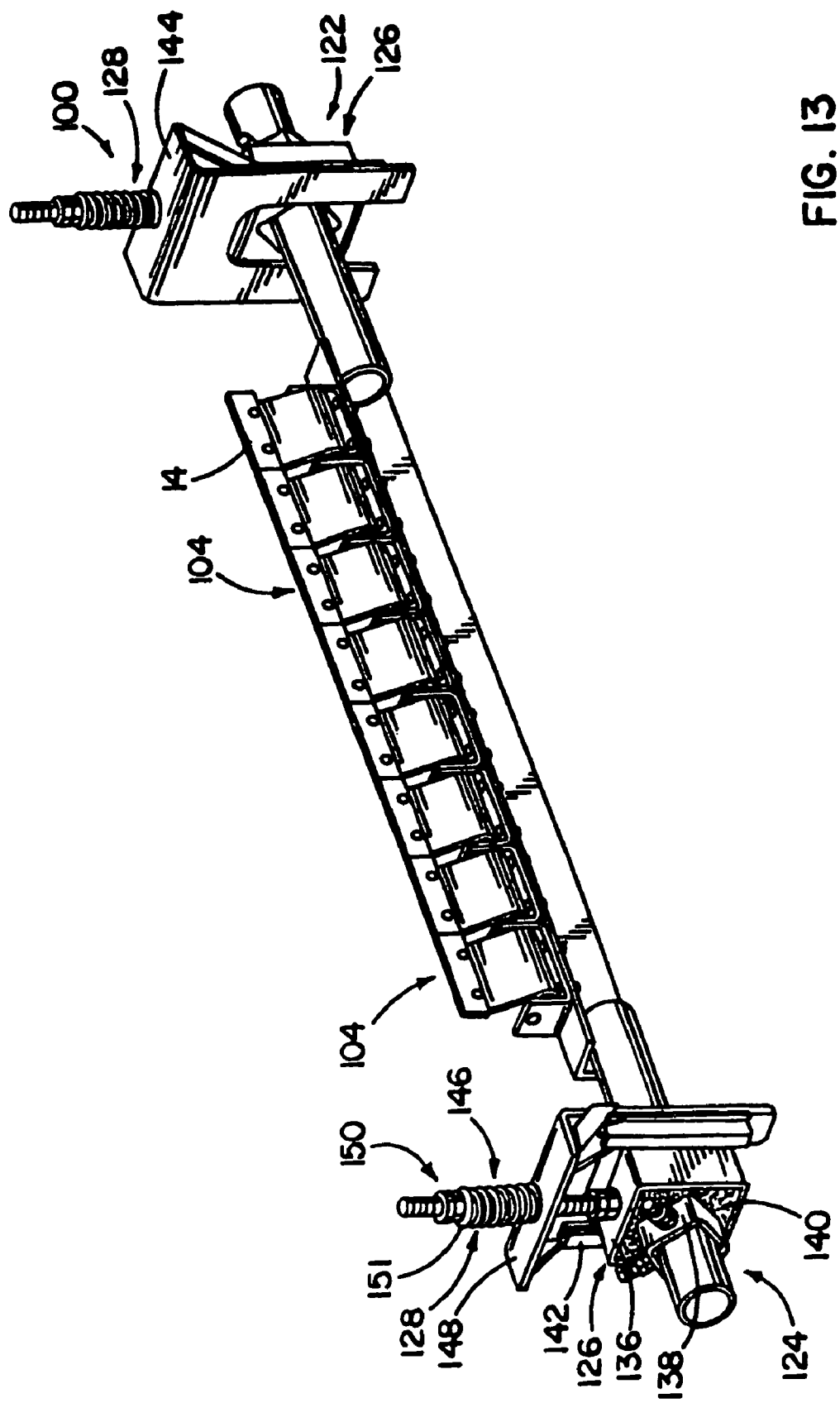
FIG. 13 is a perspective view of a belt cleaning system in accordance with the present invention showing a plurality of cleaning blades mounted to a support pole assembly for being biased into engagement with a conveyor belt.

Referring next to FIG. 13, a belt cleaner system generally designated 100 is illustrated. Belt cleaner system 100 preferably employs a plurality of scraper blades 14 arranged in side-by-side orientation for extending across the width of the conveyor belt 12 to be cleaned transverse to its downstream travel direction. In addition to the blade mount member 78 which comprises a first resilient mount to which the blades 14 are directly secured as previously described, a torsion bias mechanism 102 is also provided for each cleaner blade 14 with the blade mount member 78 being secured thereto. In this manner, each cleaner blade 14 includes a pair of resilient mounts 78 and 102 so as to form a plurality of modular cleaner units 104 disposed along the material path of the conveyor belt 12 for cleaning thereof.

Figure 14:
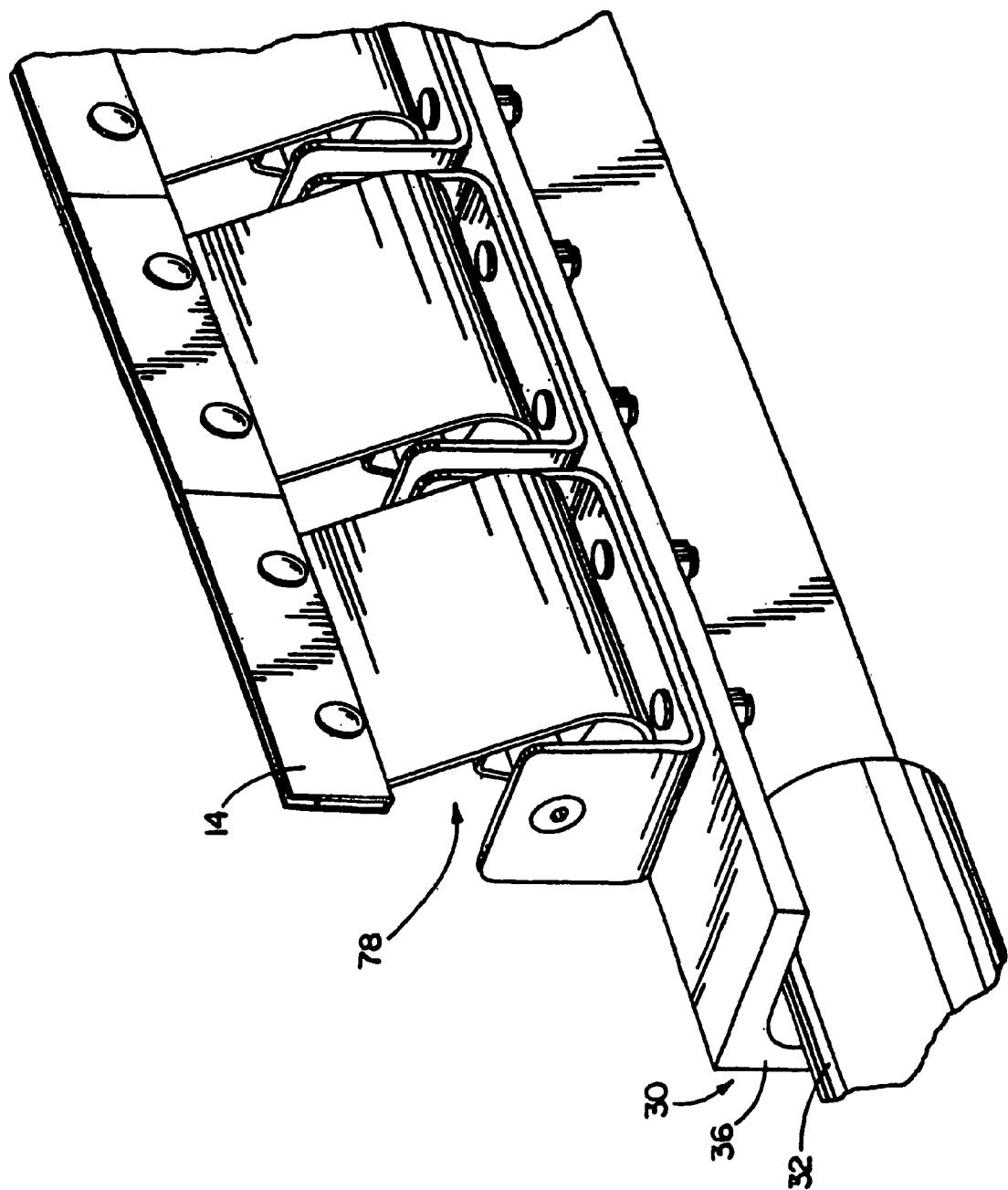
FIG. 14 is an enlarged perspective view of the belt cleaning system of FIG. 13 showing a pair of resilient mounts for each of the blades with one including an angled spring plate member and another being a torsion bias mechanism.

These units 104 are mounted to an elongate support or support assembly 30 which is in the form of previously described pole member 32 have elongate right angle bracket 36 affixed thereto. As can be seen best in FIGS. 14–16, the torsion bias mechanism 102 includes a generally U-shaped bracket 106 which is fastened to the elongate support assembly 30. Accordingly, the cleaner blades 14 are preferably secured directly to the first resilient mount in the form of blade mount member 78, and the second resilient mount for the blade 14 is secured to the elongate support 30.

The torsion bias mechanism 102 is generally disposed below and/or downstream from the blade mount member 78 so as to be protected from debris and material accumulation generated by the scraping action of the blades 14 against the belt 12. The torsion bias mechanism 102 includes outer and inner members 108 and 112 with resilient material 116 therebetween. Specifically, there is an outer sleeve 108 through which a longer extruded member 110 extends generally parallel to the axis of the support pole 32. The elongate member 110 is affixed at either end to upstanding flange arms 112 and 114 of the bracket 106. As shown, the sleeve 108 and elongate member 110 have rectangular or square-shaped configurations that are offset by 45 degrees from each other so as to define generally triangularly shaped spaces therebetween. These spaces are filled with resilient material 116 which allows the sleeve 108 to resiliently rotate about the inner member 110 thus allowing the blade 14 to resiliently pivot shifting back in the downstream travel direction of the belt 12 and downwardly away therefrom.

Figure 15:
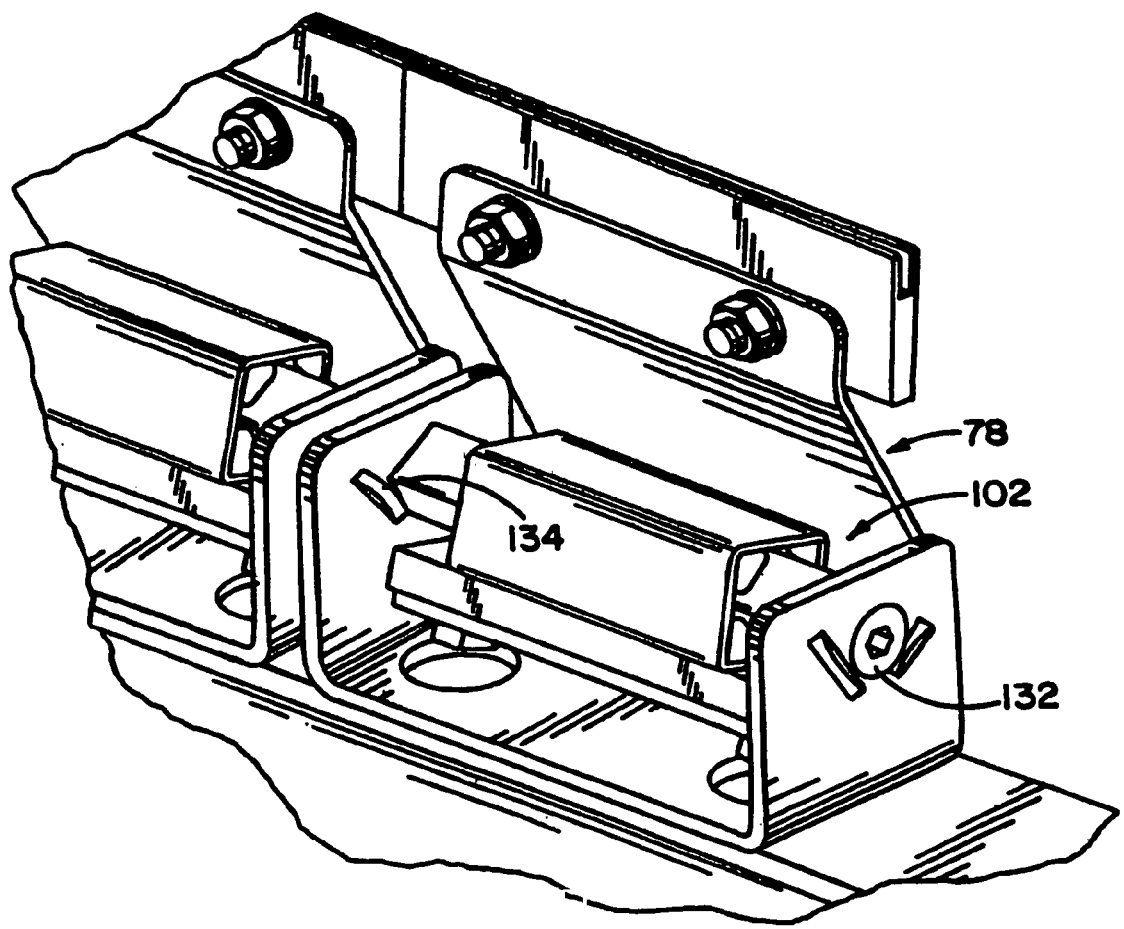
FIG. 15 is an enlarged perspective view of the belt cleaner system of FIG. 13 showing the torsion bias mechanism having an outer sleeve secured to a flat base portion of the spring plate mount.
Figure 16:
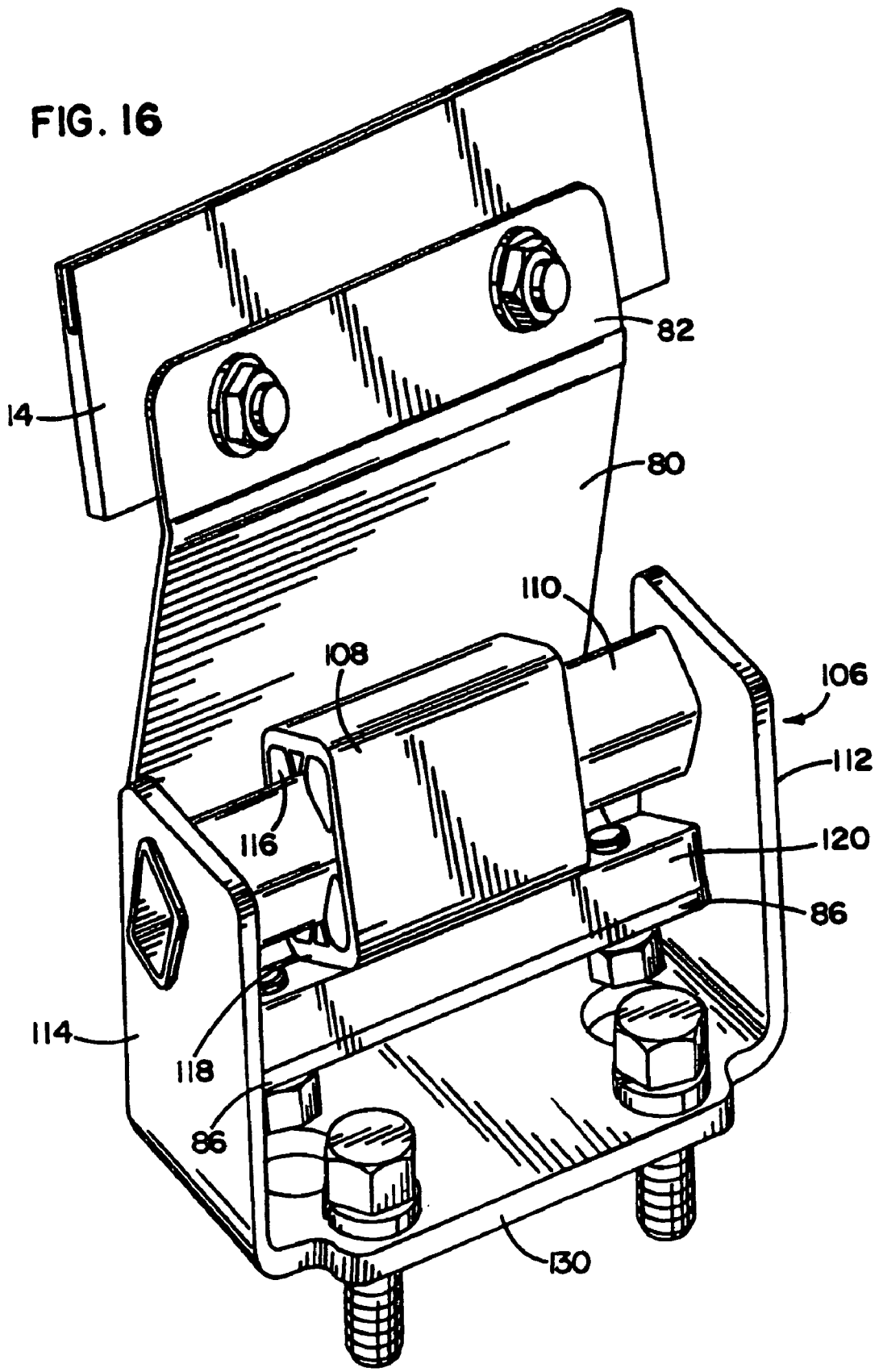
FIG. 16 is a perspective view of a modular cleaning unit including a single one of the cleaning blades and resilient mount pairs of the belt cleaner system of FIG. 13 showing an elongate member extending through the sleeve of the torsion bias mechanism and secured to a mounting bracket.

The base portion 86 of the blade mount member 78 is secured to a lower wall portion of the sleeve 108 via an elongate mounting block 120 fixed therebetween, as best seen in FIGS. 15 and 16. Accordingly, in this manner the blade mount member 78 is secured directly to the torsion bias mechanism 102 and specifically to the sleeve member 108 thereof.

To provide for further resilient mounting of the blades 14, third and fourth resilient mounts are provided as described hereinbelow. More particularly, the third and fourth resilient mounts are associated with the elongate support assembly 30 extending across the conveyor belt at either end 122 and 124 thereof. These resilient mounts can include a torsion biasing mechanism 126 and a linear or vertical biasing mechanism 128 at each end 122 and 124. As is apparent, these resilient mounts 126 and 128 will also allow for resilient shifting of the blade 14 away from the belt 12 but do so that all blades 14 are shifted simultaneously thereby. In this manner, the cleaning system 100 is provided with four different resilient mounts only two of which are disposed in the material path of the conveyor belt 12.

In particular, such as where the belt cleaning system 100 is used as a secondary cleaning system extending under the conveyor belt 12, the biasing mechanisms 126 and 128 will be disposed laterally out from under the conveyor belt so as to avoid the potential for fouling of these mechanisms by debris and scraped material from the belt surface 12*a*. By the provision of several different resilient mounts, the resilient action of the cleaner blades 14 upon being impacted such as by belt splices or the like along the belt surface 12*a* can be highly controlled. To this end, the impact energy on the blades is absorbed in the various resilient mounts while still allowing the blade to be quickly resiliently brought back into engagement with the belt 12 prior to release of all of the impact energy generated by blade impacts, particularly in the event of high impact forces on the blades 14. Thus, while the blades 14 are brought quickly back into scraping engagement with the belt surface 12*a*, the return impact force of the blades 14 on the belt 12 is kept to a minimum as the impact energy from impacts against the blade 14 is also released with the blades 14 already in scraping engagement with the belt surface 12*a*. In this manner, the return energy with which the blades 14 are brought back into engagement with the belt surface 12*a* is only a portion of that stored in the resilient mounts and thus is also kept to a minimum. This is significant in avoiding damage not only to the belt surface but to any belt splices in the conveyor belt 12 such as formed from metallic belt fasteners so as to keep belt splice life to a maximum.

Turning to more of the details, it can be seen that the torsion bias mechanism 102 is mounted behind the layback portion 80 of the blade mount member 78 so that it forms a type of shield therefore against debris scraped from the belt surface 12*a*. The blade mount member 78 has a width slightly less than the spacing between the bracket arms 112 and 114 so that the base portion 86 and mounting block 120 fits closely therebetween, as can be seen in FIGS. 15 and 16. The base 130 of the U-bracket 106 extending between and interconnecting the arms 112 and 114 at the bottom ends thereof sits flush against the elongate bracket 36 of the pole assembly 30 and is bolted thereto.

The inner member 110 of the torsion bias mechanism 102 is held non-rotatably by the bracket arms 112 and 114. For this purpose, the member 110 can be provided with internal threads in the ends thereof for receipt of a threaded shank of fastener 132 therein. As previously mentioned, the member 110 can have a square cross-sectional configuration. To ensure against rotation of the member 110, the bracket flange arms 112 and 114 can be provided with integral lugs 134 that extend along two adjoining sides of the member 110 at the ends thereof, as can be seen in FIG. 15.

The resilient mounts 126 and 128 will next be described with reference to FIG. 13. As shown, the pole ends 122 and 124 extend through square shaped housings 136. In addition, sleeve members 138 are secured to the pole ends 124 and 126 as by set screws. The sleeves 138 can also have a square cross-sectional configuration albeit offset by approximately 45 degrees from the orientation of the square-shaped housing 136. Between the inner sleeve member 138 and the housing 136 is resilient material 140 so that the housing 136, sleeve 138 and resilient material 140 form the torsion bias mechanism 126 allowing resilient rotary action of the pole assembly 30 for resilient pivoting of all the blade members 14 in the downstream travel direction of the belt 12 and down away from the belt 12.

The housings 136 are supported for resilient, vertical sliding movement by slide bearings 142 on either side of a generally clevis-shaped frame member 144. A vertical guide or rod 146 extends from an abutment at the top of the housing 136 and through and above upper horizontal flange 148 of the frame member 144. The upper end of the guide 146 is threaded so as to receive an adjustment nut 150 threadably thereon. A coil spring 151 extends about the guide post 146 between the flange 148 and the nut 150. Accordingly, the amount of vertical tension provided by the linear bias mechanism 128 can be controlled by tightening or loosening the adjustment nuts 150. Depending on the amount of tension set in the bias mechanism 128, and the relative resiliency between it and the other resilient mounts described herein, the support 30 can shift up and down when the linear bias mechanism 128 is operable via resilient vertical movement of the housings 136 along the respective frame members 144. In this manner, the linear bias mechanism 128 allows for a vertical resilient shifting action for all of the blades 14 down away from the belt 12.

Turning next to FIG. 17 and 18, a pair of alternative stops 152 and 154 are shown for use between the first resilient mount in form of spring plate mount member 78 and the torsion biasing mechanism 102, and particularly the outer sleeve 108 thereof. In both instances, the stops 152 and 154 limit the resilient shifting of the blade mount member 78 relative to the torsion bias mechanism 102. With respect to the stop 152 it provides more of a hard stop whereas the stop 154 is intended to provide more of a flexible stop and to this end it can be formed of an elastomer material such as urethane.

More specifically, the stop 152 is shown as being secured to the back side of the layback portion 80 of the blade mount member 78 in a position slightly spaced above the upper wall 156 of the sleeve 108. However, when the blade 14 is impacted such as by a splice in the conveyor belt 12, the layback portion 80 pivots down and rearwardly shifting the stop 152 toward the sleeve 108, and particularly the upper wall 156 thereof. If the impact force is great enough the layback portion 80 will shift bringing the hard stop 152 into abutment with the wall portion 156 prevent further resilient shifting of the layback portion 80. Any further shifting of the blade 14 due to the two resilient mounts associated with the blade 14 under the conveyor belt 12 has to be generated by the torsion bias mechanism 102. In this manner, the bias mechanism 102 is forced to absorb some of the energy of the impact force on the blade 14. In high speed belt operations such as with belt speeds between 1000 to 1200 feet per minute and/or where the belts 12 include relatively robust and thick belt fasteners, the stop 152 is anticipated as being particularly helpful in increasing the life of the spring plate blade mount member 78.

The resilient stop 154 of FIG. 18 is anticipated as providing the same benefits as the hard stop 152. In addition, it can be seen that the resilient stop 154 is comprised of resilient material that substantially feels the void between the back side of the blade mount member 78 and the sleeve 108 so that it is engaged about the entire upper wall portion 156 and front wall portion 160 as well as along small sections of the lower wall portion 118 and rear wall portion 158 of the sleeve 108. In this manner, the stop 154 also prevents material build-up between the blade mount member 78 and the torsion bias mechanism 102 and also adds another dampening factor to the deflection of the spring plate member 78. Moreover, the stop 154 more evenly distributes the load around the sleeve 108 due to the large surface area of its engaging contact about the wall portions thereof, as described above.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A secondary belt cleaning system for cleaning a conveyor belt running in a belt travel direction between conveyor pulleys, the secondary belt cleaner system comprising:
    an elongate support having opposite ends and extending under the conveyor belt transverse to the belt travel direction;
    a plurality of side-by-side aligned cleaning blades biased into scraping engagement with the belt;
    a pair of resilient mounts for each of the cleaning blades disposed under the belt operably secured to the support with the resilient mounts allowing the blade to shift in the belt travel direction and down away from the belt due to impacts therewith during conveyor belt operations; and
    resilient biasing mechanisms at the ends of the support out from under the conveyor belt that allows for resilient shifting of the support.

2. The secondary belt cleaning system of claim 1 wherein the pair of resilient mounts include an angled spring plate member having a layback portion including an upper end to which the cleaning blade is secured and extending at a predetermined layback angle toward the belt, and a torsion bias mechanism to which the spring plate member is mounted allowing the spring plate member to resiliently rotate about an axis substantially parallel to the elongate support.

3. The secondary belt cleaning system of claim 2 wherein the torsion bias mechanism is disposed behind the layback portion so that the layback portion serves to protect the torsion bias mechanism from scrapped material from the belt.

4. The secondary belt cleaning system of claim 2 wherein the torsion biasing mechanism includes an inner member, an outer sleeve extending about the inner member and resilient material between the sleeve and the inner member to allow the sleeve to resiliently rotate about the inner member, and the angled spring plate member comprises a lower arcuate portion spaced upstream of the upper end of the layback portion and a flat base portion connected to the arcuate portion and secured to the outer sleeve.

5. The secondary belt cleaning system of claim 4 including a stop between the layback portion and the outer sleeve to limit deflection of the layback portion and for causing resilient rotation of the sleeve.

6. The secondary belt cleaning system of claim 1 wherein the pair of resilient mounts include a stop therebetween so that one of the mounts is limited in an amount of resilient shifting provided to the blade thereby so that only the other mount of the pair generates resilient shifting of the blade.

7. The secondary belt cleaning system of claim 1 wherein the resilient biasing mechanisms comprise a pair of biasing mechanisms at each end of the support with one biasing mechanism allowing for rotary resilient shifting of the support and the other biasing mechanism allowing for vertical resilient shifting of the support.

* * * * *